United States Patent [19]

Blair

[11] 3,772,662

[45] Nov. 13, 1973

[54] WRITE RING DETECTOR FOR MAGNETIC RECORDERS

[75] Inventor: Ronald S. Blair, Houston, Tex.

[73] Assignee: Texas Instruments Incorporated, Dallas, Tex.

[22] Filed: Dec. 30, 1971

[21] Appl. No.: 214,349

[52] U.S. Cl. .......................................... 340/174.1 G

[51] Int. Cl. .......................................... G11b 15/02

[58] Field of Search .............. 340/174.1 A, 174.1 G; 179/100.2 A, 100.2 D; 346/136

[56] References Cited

UNITED STATES PATENTS

| | | | |
|---|---|---|---|
| 3,299,144 | 1/1967 | Sims, Jr. | 340/174.1 G |
| 3,465,349 | 9/1969 | Schoeneman | 340/174.1 A |
| 3,426,337 | 2/1969 | Black et al. | 340/174.1 A |

*Primary Examiner*—Vincent P. Canney
*Attorney*—Harold Levine et al.

[57] ABSTRACT

In a read/write magnetic recording apparatus a write ring is inserted into an annular groove in the magnetic tape reel to indicate a write mode of operation. A hub assembly by which the magnetic tape reel is secured to the recording apparatus includes a reflective surface the position of which is dependent upon the existence or non-existence of the write ring. When the position of the reflective surface corresponds to the existence of the write ring, a light beam emitted from a light source is reflected by the reflective surface and received by a photosensor which produces an electrical output. Electrical circuitry is responsive to the electrical output of the photosensor to produce a logic pulse to enable the write circuitry of the recording apparatus. The write circuitry of the recording apparatus is inhibited when there is no electrical pulse output from the electrical circuitry.

5 Claims, 5 Drawing Figures

WRITE RING DETECTOR FOR MAGNETIC RECORDERS

This invention relates to magnetic recording apparatus, and more particularly to an improved method and apparatus for detecting the existence of a write ring in a read/write magnetic recording apparatus to enable the write mode of operation of the recording apparatus.

Magnetic recording apparatus having a read mode of operation and a write mode of operation is widely used for storage of digital data to be processed in digital data processing systems. In a read mode of operation, data which is stored on magnetic tape is read from the magnetic recording apparatus into the data processing system. In a write mode of operation, digital data is written from the digital data processing system onto magnetic tape by the magnetic recording apparatus. To enable the write mode of operation, the practice has developed to insert a plastic ring into an annular groove in the magnetic tape reel. This plastic ring is commonly referred to as a write ring. The tape reel and write ring may, for example, conform to the Proposed American Standard published in Communications of the ACM, Vol. 13, No. 11 (November, 1970). The recording apparatus includes apparatus for detecting the existence of the write ring to enable the write circuitry; the write circuitry is inhibited at all times when the write ring is not present in the annular groove. Since existing data on the magnetic tape would be destroyed by inadvertent selection of the write mode of operation, it is imperative to detect the existence of the write ring with consistent accuracy.

One known technique that has been used to detect the existence of the write ring is a continuously contacting roller switch which is in contact with the write ring when it is present in the annular groove, thus to close the switch to enable the write circuitry. Recognized disadvantages of this approach include excessive noise, wear of rollers and write rings, false signals resulting from poor tolerance of reels and mating apparatus, potential damage to the roller or switch mechanism during operator loading procedures, and alignment difficulties.

Another known approach includes a solenoid switch assembly which employs a stationary rod which contacts the write ring when it is present in the annular groove. When a magnetic tape reel is loaded, the write ring depresses the rod sufficiently to close a switch which in turn actuates a solenoid to withdraw the stationary rod from contact with the write ring and allow it to rotate freely. Additional electric contacts are closed to enable the write circuitry. Although this technique eliminates the continuous mechanical contact associated with the above mechanism, alignment problems still exist in regard to positioning the rod with respect to the reel. The switches must be carefully adjusted to operate at the proper point when the rod is depressed by the write ring. Periodic maintenance is required to insure reliable operation. Also, special electrical circuits are required to lower the voltage supplied to the solenoid after the coil is energized in order to prevent overloading. The size and required positioning of the solenoid switch assembly further complicate mounting and alignment.

Accordingly, the present invention comprises an improved method and apparatus for detecting the existence of a write ring in a magnetic recording apparatus.

The apparatus of this invention includes a light source which directs a light beam onto a reflective surface when the write ring is present in the annular groove of the magnetic tape reel. The light beam is reflected and sensed by a photosensor which produces an electrical output. The electrical output of the photosensor is amplified and applied to a memory element, the content of which is periodically sampled. The write circuitry of the recording apparatus is enabled in response to the existence of a logic one pulse in the memory element when sampled. In a specific embodiment, the reflective surface is secured to the hub assembly onto which the magnetic tape reel slidably mounts into place on the recording apparatus. The reflective surface is movably mounted such that it will be in the path of incident radiation from the incandescent light source only when the write ring is present in the annular groove of the reel. This approach eliminates physical contact of stationary parts with rotating parts, thereby eliminating a source of noise and wear. Critical mechanical alignment problems and periodic mechanical adjustments are eliminated. The detection apparatus is fail safe since failures of either the light source or the sensor will prohibit generation of a write command. The detection apparatus is also conveniently compact in size and is relatively economical.

Accordingly, it is an object of this invention to provide an improved method and apparatus for detecting the existence of a write ring in a magnetic recording apparatus.

It is another object of the invention to provide a method and apparatus which employ optoelectrical techniques for detecting the existence of a write ring in a magnetic recording apparatus.

Additional objects and advantages of the invention will become apparent from the following detailed description in conjunction with the drawings, in which.

Figure 1:
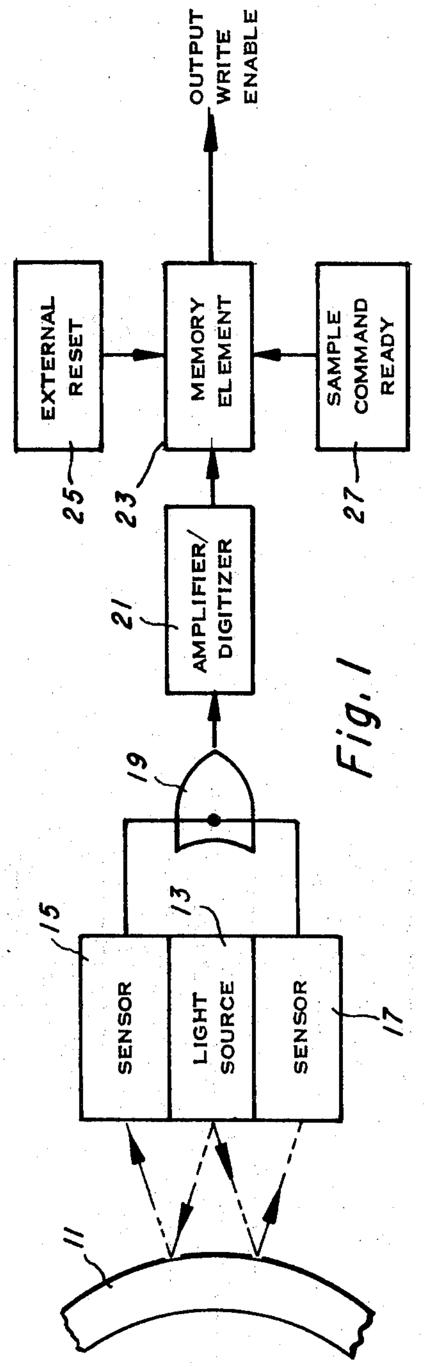
FIG. 1 is a general block diagram of the improved write ring detection apparatus.

Referring now to the drawings, FIG. 1 is a general block diagram of the improved write ring detector apparatus of this invention. When the write ring is present in the tape reel, a light beam emitted from light source 13 will be reflected by the reflective surface 11 and detected by photosensors 15 and 17. The outputs of the photosensors 15 and 17 are connected as inputs to the wired OR circuit 19. An output of either sensor 15 or 17 will produce an output of OR gate 19. The combination of a pair of sensors connected as inputs to an OR gate provide a form of redundancy check, protecting against the contingency of black spots on the reflective surface 11. The output of OR gate 19 is connected as an input to amplifier/digitizer circuit 21, the output of which is connected as an input to the memory element 23. An external reset circuit 25 is connected to reset the memory element, typically each time the tape reel is changed. The memory element 23 is sampled to produce an output write enable signal under control of the sample command ready circuit 27.

In operation, when the write ring is present in the tape reel, the reflective surface 11 is positioned so that radiation emitted from incandescent light source 13 will be reflected by the reflective surface and detected by the sensors 15 and 17. Sensors 15 and 17 produce an electrical output to the OR gate 19, which then produces a pulse output. The output of the OR gate is stored in memory element 23 and is sampled under control of the sample command ready circuit 27. Each time the tape reel is removed from the recording apparatus and reinserted a reset signal will be supplied to the memory element 23 to prepare the memory element for storage of the new write ring indication.

Figure 2:
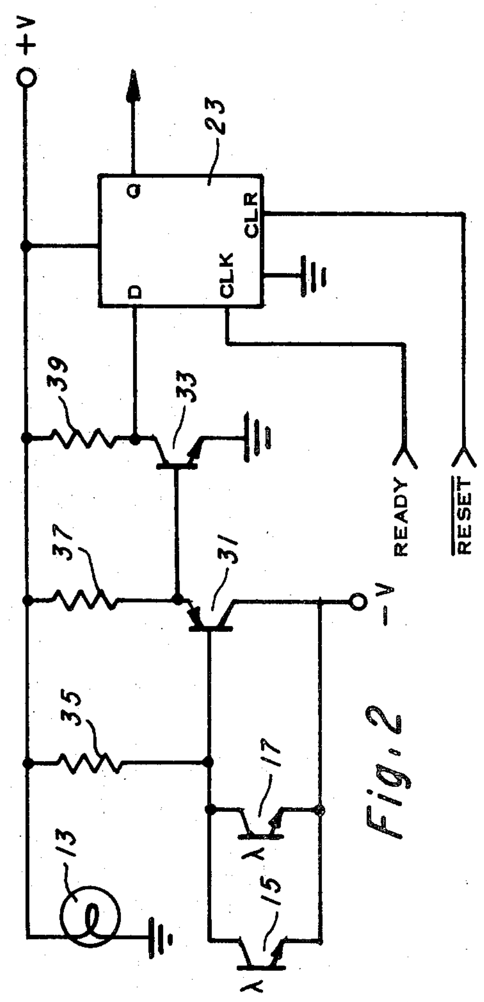
FIG. 2 is an electrical schematic diagram of the electrical components of the block diagram of FIG. 1.

Refer now to FIG. 2 for an electrical schematic diagram of the components of FIG. 1. The incandescent source 13 is connected in series between the positive supply voltage +V and the reference potential, thus to draw current from the supply voltage and heat up the incandescent filament of the source to produce radiation. The radiation from incandescent light source 13 is directed upon the base regions of photo transistors 15 and 17, which are the sensors 15 and 17 of FIG. 1. Photo transistors 15 and 17 are conventional photo transistors which draw a collector current which is proportional to the intensity of radiation directed upon the base regions. Photo transistors 15 and 17 are connected in parallel, with their collector terminals being connected together and emitter terminals being connected together. A common emitter terminal formed thereby is connected directly to a negative supply voltage −V. The collectors of the photo transistors are connected through resistor 35 to the positive supply voltage +V. Parallel connection of the sensors in the manner illustrated results in an effective wired OR circuit. Illumination of the base region of either photo transistor 15 or 17 will result in the respective transistor drawing a collector current, thereby biasing on transistor 31. The voltage required to bias on transistor 31 is a threshold voltage which is directly proportional to a threshold intensity of illumination on the base terminals of photo transistors 15 and 17. Thus a threshold intensity of radiation directed upon a base terminal of either or both photo transistors 15 or 17 will result in transistor 31 being biased on. The base terminal of NPN transistor 31 is connected to the collectors of photo transistors 15 and 17 and through resistor 35 to positive voltage supply +V. The collector of transistor 31 is connected to the negative supply voltage −V. The emitter of transistor 31 is connected directly to the base terminal of transistor 33 and is connected to the positive supply voltage +V through resistor 37. The emitter of transistor 33 is connected directly to the reference potential. The collector of transistor 33 is connected to the D input of the flip flop, or logic storage element, 23 and is also connected through resistor 39 to positive supply voltage +V. When current is being drawn by transistor 31, the potential at the base of transistor 33 will bias that transistor off. While transistor 33 is biased off, the collector potential is approximately equal to the supply voltage +V, thus a logic 1 signal is supplied to the input terminal D of flip flop 23. When no current is being drawn by transistor 31, i.e., when that transistor is biased off, the potential appearing at the base terminal of transistor 33 will bias transistor 33 on. When transistor 33 is on, the collector potential is approximately equal to the reference potential, which is the logic 0 signal. During this time the logic 0 signal is applied to the input terminal D of flip flop 23.

The photo transistors 15 and 17 are connected in parallel to effectively provide the wired OR circuit 19 of FIG. 1. Transistors 31 and 33 collectively form the amplifier/digitizer element 21 of FIG. 1. The transistors 31 and 33 amplify the collector current of the photo transistors and provide a digitized signal. Digitization is achieved since the output signal at the collector of transistor 33 is a logic 0 or logic 1 dependent upon the existence of illumination of threshold intensity upon the base terminal of photo transistor 15 and/or 17. The flip flop storage element 23 is the memory element 23 of FIG. 1. The write enable output is taken from the Q terminal of flip flop 23. The ready signal from the sample command ready element 27 is connected to the clock input of flip flop 23. The inverse reset signal from the external reset element 25 is connected to the clear input terminal of the flip flop 23.

Briefly summarizing the operation of the write ring detector apparatus, radiation from the incandescent light source 13 is directed upon the reflective surface 11 only when a write ring is present in the magnetic tape reel. The radiation from the light source is reflected by the reflective surface and detected by the photo transistors 15 and 17. When the intensity directed upon the bases of transistors 15 and/or 17 is a threshold level of intensity, transistor 31 will be biased on, which in turn biases transistor 33 off, such that a logic 1 signal is supplied to the D input of flip flop 23 by virtue of positive supply voltage +V. The content of the flip flop storage element 23 is sampled under control of the ready signal attached to the clock input thereof. Thus a logic 1 will be output from the Q terminal to enable the write circuits in a magnetic recording apparatus when the write ring is present in the magnetic tape reel. When the threshold intensity is not present at the base terminals of the transistors 15 and 17, transistor 31 is biased off, thereby biasing transistor 33 on and supplying a logic 0 input to the D terminal of flip flop 23. As the contents of the flip flop storage elements 23 are periodically sampled under the control of the ready signal, a logic 0 is output from the Q terminal to inhibit the write circuitry of the recording apparatus. In this manner, the write circuitry of the recording apparatus is inhibited when the write ring is not present in the magnetic tape reel.

Figure 3:
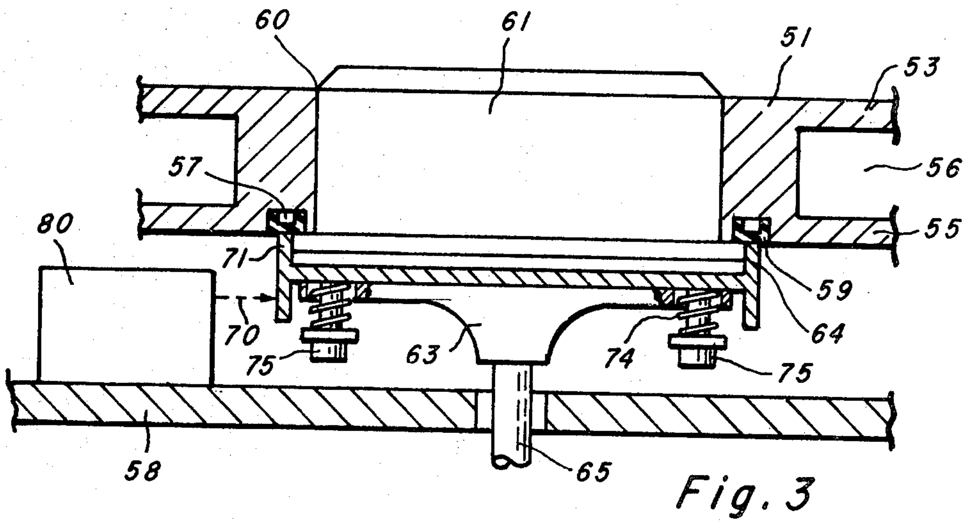
FIG. 3 is a partial section view illustrating a magnetic tape reel slidably mounted onto a hub assembly secured to a magnetic recording apparatus, further illustrating the respective alignment of the light source and sensor housing and reflective surface.
Figure 4:
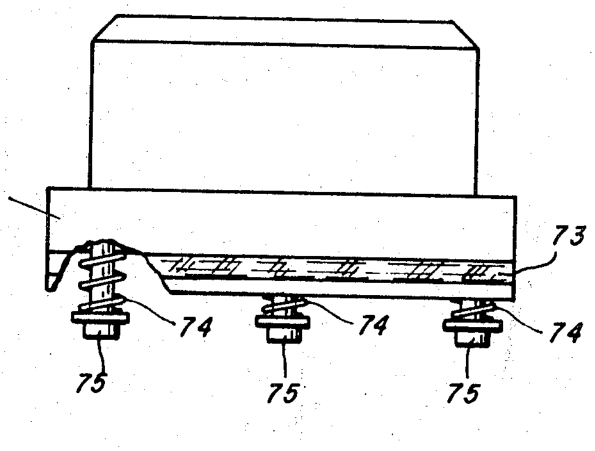
FIG. 4 is a side view of the hub assembly including the reflective surface.
Figure 5:
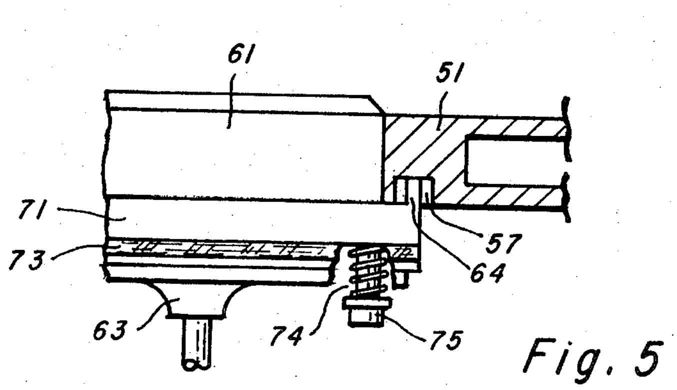
FIG. 5 is a partial view of the mounted hub assembly and reflective surface with a magnetic tape reel thereon when the write ring is not present in the annular groove of the tape reel.

Referring now to FIGS. 3 – 5 for an illustration of the mechanical apparatus associated with this invention, a magnetic tape reel 51 includes flanged edges 53 and 55 for guiding the tape into region 56. The reel is slidably mounted onto fixed portion 61 of the hub assembly which is secured by small screws to turntable 63. Turntable 63 is secured to rotatable shaft 65 which is coupled to be rotated by a motor (not illustrated) mounted behind panel 58. Magnetic tape reel 51 and hub 61 may be rotated in either direction by shaft 65 to unwind or wind magnetic tape onto the reel.

The hub assembly is comprised of a fixed portion 61 and a movable portion 71 which is secured to the fixed portion by screws 75 with springs 74 therebetween. The tension of the springs 74 hold the movable portion 71 into the position illustrated in FIG. 4. A reflective surface 73 extends around the movable portion 71. The reflective surface 73 may, for example, be composed of silver or evaporated chromium or aluminum. Referring specifically to FIG. 3, a write ring 59 is shown inserted into the annular groove 57 extending around the tape reel 51. The write ring 59 is typically comprised of plastic or similar material and is inserted into the annular groove 57 prior to mounting the tape reel onto the hub assembly. The movable portion 71 of the hub assembly abuts against the write ring 59 and is thus forced downward against tension in the springs 74. The incandescent light source and sensors are mounted in the housing 80 which is positioned such that a light beam emitted from the light source will travel along the path indicated by the dashed arrow 70 to be reflected by the reflective surface 73 and received by the photosensors. As most clearly illustrated in FIG. 5, when the write ring 59 is not present in the annular groove 57, the tension in the springs 74 forces the movable portion 71 of the hub assembly upward into the groove 57 until the flange portion 64 abuts against the inner surface of the reel 51. Thus, when the write ring is not present in the annular groove, radiation emitted from the incandescent light source along the path of dashed arrow 70 will not impend upon the reflective surface 73, and any reflected light which may be detected by the photosensors will be insufficient to meet the threshold intensity level required to produce a logic 1 output of the circuit of FIG. 2.

It is anticipated that various modifications within the scope of disclosed invention will now suggest themselves to those skilled in the art. The description herein with reference to a specific embodiment of the invention is intended only as illustrative of the principles disclosed.

What is claimed is:

1. In a recording apparatus of the type having a write mode and a read mode and wherein the presence of a write indicator is detected to enable the write mode and said write indicator is a write ring inserted into an annular groove in a magnetic tape reel to enable the write mode, the combination comprising:

a. a reflective surface which occupies a first position when said write indicator is present and a second position when said write indicator is not present, said reflective surface secured to a movable portion of a hub assembly onto which said magnetic tape reel slidably mounts, such that said movable portion abuts against said write ring to cause said reflective surface to occupy said first position;

b. means for illuminating a portion of said reflective surface when it occupies said first position;

c. sensing means responsive to light reflected from said reflective surface to produce an electrical signal; and d. circuit means responsive to said electrical signal to produce a write enable signal.

2. In a recording apparatus of the type having a write mode and a read mode and wherein the presence of a write indicator is detected to enable the write mode and said write indicator is a write ring inserted into an annular groove in a magnetic tape reel to enable the write mode, the combination comprising:

a. a reflective surface which occupies a first position when said write indicator is present and a second position when said write indicator is not present wherein said reflective surface is secured to a movable portion of a hub assembly onto which said magnetic tape reel slidably mounts, such that said movable portion abuts against said write ring to cause said reflective surface to occupy said first position;

b. means for illuminating a portion of said reflective surface when it occupies said first position;

c. a first phototransistor sensitive to light reflected from said reflective surface to produce an electrical signal; and d. circuit means responsive to said electrical signal to produce a write enable signal, said circuit means comprising e. a first transistor coupled in series between positive and negative voltage supplies, with the base terminal thereof coupled to the collector terminal of said first photo transistor, and f. a second transistor coupled in series between a positive voltage supply and a reference potential, with the base terminal thereof connected to the emitter terminal of said first transistor and wherein the circuit output is taken from the collector terminal of said second transistor, whereby g. illumination of threshold intensity directed upon the base of said photo transistor will bias said first transistor on and said second transistor off, thereby producing a logic one circuit output signal.

3. In a read/write magnetic recording apparatus, the combination comprising:

a. a turntable secured to a rotatable shaft which is coupled to be rotated by a motor;

b. a hub assembly secured to said turntable, said hub assembly being comprised of a fixed portion and a movable portion;

c. a reflective surface on said movable portion of said hub assembly;

d. a magnetic tape reel slidably mounted onto said fixed portion of said hub assembly, said tape reel having an annular groove therein;

e. a write ring inserted in said annular groove to select a write mode of operation, and abutting said movable portion to cause said reflective surface to occupy a predetermined position;

f. an incandescent light source positioned to direct a light beam to said predetermined position; and g. sensor means positioned to receive light reflected from said reflective surface at said predetermined position and produce a write enable signal.

4. The combination of claim 3 wherein said sensor means is a photo transistor.

5. The combination of claim 4 further comprising circuit means coupled to the output terminal of said photo transistor to produce a logic write enable signal when illumination of a threshold intensity is detected by said photo transistor.

* * * * *